US012779937B2

(12) United States Patent
Kim et al.

(10) Patent No.: US 12,779,937 B2
(45) Date of Patent: Nov. 3, 2026

(54) AIR CONDITIONER FOR VEHICLE

(71) Applicants: Hyundai Motor Company, Seoul (KR); Kia Corporation, Seoul (KR); Hanon Systems, Daejeon (KR)

(72) Inventors: Eung Young Kim, Anyang-Si (KR); Yoon Hyung Lee, Seongnam-Si (KR); Myung Hoe Kim, Seoul (KR); Seung Ho Lee, Daejeon (KR); Sang Ki Lee, Daejeon (KR); Dae Bok Keon, Daejeon (KR); Yong Sik Kim, Daejeon (KR); Dae Keun Park, Daejeon (KR); Chang Hoon Sung, Daejeon (KR); Hyeon Seok Kim, Daejeon (KR)

(73) Assignees: Hyundai Motor Company, Seoul (KR); Kia Corporation, Seoul (KR); Hanan Systems, Daejeon (KR)

( * ) Notice: Subject to any disclaimer, the term of this patent is extended or adjusted under 35 U.S.C. 154(b) by 403 days.

(21) Appl. No.: 18/511,622

(22) Filed: Nov. 16, 2023

(65) Prior Publication Data

US 2024/0174045 A1 May 30, 2024

(30) Foreign Application Priority Data

Nov. 28, 2022 (KR) ........................ 10-2022-0161539

(51) Int. Cl.
*B60H 1/00* (2006.01)
*B60S 1/02* (2006.01)

(52) U.S. Cl.
CPC .......... *B60H 1/00564* (2013.01); *B60S 1/023* (2013.01)

(58) Field of Classification Search
CPC ............................ B60H 1/00564; B60S 1/023
USPC .......................................................... 454/126
See application file for complete search history.

(56) References Cited

U.S. PATENT DOCUMENTS 6,311,763 B1 * 11/2001 Uemura ................. B60H 1/247 62/244
6,959,754 B2 * 11/2005 Lee .................... B60H 1/00685 165/203
8,689,860 B2 * 4/2014 Seto ................... B60H 1/00028 165/203
8,997,838 B2 * 4/2015 Seto ................... B60H 1/00678 454/126
11,117,443 B2 * 9/2021 Rausch ................ B60H 1/3202
2018/0105147 A1 * 4/2018 Iyer ........................... B60S 1/54

* cited by examiner

*Primary Examiner* — Avinash A Savani
*Assistant Examiner* — Dana K Tighe
(74) *Attorney, Agent, or Firm* — MORGAN, LEWIS & BOCKIUS LLP

(57) ABSTRACT

An air conditioner for a vehicle with an improved structure so that hot air is not directly discharged to a defrost vent in a floor mode or a mix mode, includes an air conditioning case in which an air flow path is formed, and a cooling heat exchanger and a heating heat exchanger provided sequentially on the air flow path of the air conditioning case in an airflow direction, wherein a defrost vent, a face vent, and a floor vent are formed on the air conditioning case, wherein the defrost vent includes a first defogging flow path allowing air passing through the heating heat exchanger to be discharged directly, and a second defogging flow path allowing air passing through the cooling heat exchanger or the heating heat exchanger to be mixed and discharged therethrough.

13 Claims, 11 Drawing Sheets

AIR CONDITIONER FOR VEHICLE

CROSS REFERENCE TO RELATED APPLICATION

The present application claims priority to Korean Patent Application No. 10-2022-0161539, filed Nov. 28, 2022, the entire contents of which is incorporated herein for all purposes by this reference.

BACKGROUND OF THE PRESENT DISCLOSURE

Field of the Present Disclosure

The present disclosure relates to an air conditioner for a vehicle, and more specifically, to an air conditioner for a vehicle in which heat exchangers for performing cooling and heating lie horizontally.

Description of Related Art

Generally, an air conditioner for a vehicle is an internal part of a vehicle which is provided to cool or heat a vehicle interior in summer or winter or secure a driver's forward and backward field of views by removing frost or the like sticking to a windshield in rainy weather or winter. The air conditioner usually has both a heating system and a cooling system, and thus selectively introduces outside air or inside air to heat or cool the air, and then blow the outside air or the inside air into the vehicle interior to cool, heat, or ventilate the vehicle interior.

Among various types of air conditioners for a vehicle, there is a slim type air conditioner in which heat exchangers are provided to lie horizontally. FIG. 1 is a cross-sectional view illustrating a conventional air conditioner for a vehicle with horizontally-disposed heat exchangers.

Referring to FIG. 1, the conventional air conditioner for a vehicle includes an air conditioning case 10 on which an air inlet 23 is formed at the bottom thereof, an evaporator 11 which is a cooling heat exchanger, and an indoor condenser 13 which is a heating heat exchanger. The evaporator 11 and the indoor condenser 13 are sequentially provided inside the air conditioning case 10 in an airflow direction. An electric heater 14, such as a positive temperature coefficient (PTC) heater, is provided at a downstream side of the indoor condenser 13 in the airflow direction.

The evaporator 11, the indoor condenser 13, and the electric heater 14, which are heat exchangers, are all disposed to lie horizontally. In other words, air flows into the air inlet 23 at the bottom of the air conditioning case 10 to flow from the bottom to the top, and the evaporator 11, the indoor condenser 13, and the electric heater 14 are disposed sequentially from the bottom. A temperature door 12 is provided between the evaporator 11 and the indoor condenser 13.

The temperature door 12 adjusts a temperature of the vehicle interior by adjusting an opening amount of a hot air passage in which air passes through the indoor condenser 13 and a cooling air passage through which air bypasses the indoor condenser 13. A plurality of air outlets are formed on the air conditioning case 10. The air outlet includes a defrost vent 20, a face vent 19, a floor vent 18, and a rear seat vent 24. The defrost vent 20, the face vent 19, and the floor vent 18 discharge air to front seats of the vehicle, and the rear seat vent 24 includes a console, a B-pillar, a rear seat floor vent, and the like.

Furthermore, a plurality of doors for adjusting an opening amount of the air outlet is provided in the air conditioning case 10. In other words, a defogging door 17 for adjusting an opening amount of the defrost vent 20, a vent door 16 for adjusting an opening amount of the face vent 19, a floor door 15 for adjusting an opening amount of the floor vent 18, and rear seat doors 21 and 22 for adjusting an opening amount of the rear seat vent 24 are provided in the air conditioning case 10.

Further referring to FIG. 2, in the case of a mode in which both the defrost vent 20 and the floor vent 18 are opened, such as a floor mode or a mix mode, hot air coming from the defrost vent 20 blows on occupant's face, causing dissatisfaction. This is because an outlet of the defrost vent 20 is disposed directly above the heating heat exchanger due to a structure of the horizontally-disposed heat exchangers. Furthermore, hot air is directly discharged to the internal through the defrost vent 20, making it difficult to satisfy the criterion in which a temperature at the floor vent 18 side should be higher than a temperature at the defrost vent 20 side.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an air conditioner for a vehicle with an improved structure so that hot air is not directly discharged to a defrost vent in a floor mode or a mix mode.

An air conditioner for a vehicle according to present disclosure including an air conditioning case in which an air flow path is formed, and a cooling heat exchanger and a heating heat exchanger provided sequentially on the air flow path of the air conditioning case in an airflow direction, wherein a defrost vent, a face vent, and a floor vent are formed on the air conditioning case, wherein the defrost vent includes a first defogging flow path allowing air passing through the heating heat exchanger to be discharged directly, and a second defogging flow path allowing air passing through the cooling heat exchanger or the heating heat exchanger to be mixed and discharged therethrough.

An internal flow path of the air conditioning case may be formed in a vertical direction with respect to the ground so that the air flow path is directed from a downward direction, which is a direction of gravity, to an upward direction, and the cooling heat exchanger and the heating heat exchanger on the internal flow path may include a structure which is sequentially disposed from the downward direction, which is the direction of gravity, to the upward direction in correspondence to the air flow path from the downward direction, which is the direction of gravity, to the upward direction.

The air conditioner may include a defogging outlet separator configured to prevent the hot air passing through the heating heat exchanger to be directly discharged through the second defogging flow path.

The defogging outlet separator may include a partition wall configured to partition between the first defogging flow path and the second defogging flow path.

The defogging outlet separator may include a hot air guide baffle formed to extend from the partition wall to block air passing through the heating heat exchanger from being discharged directly through the second defogging flow path.

The first defogging flow path, the second defogging flow path, and the face vent may be sequentially disposed from the front toward the rear of the vehicle, the partition wall may extend in the vertical direction, and the hot air guide baffle may be formed to extend from a lower end portion of the partition wall toward the face vent.

The air conditioner may include a defogging door slidably connected to an inlet of the defrost vent to adjust openings of the first defogging flow path and the second defogging flow path, wherein the defogging door is opened in an order of the second defogging flow path and the first defogging flow path.

The partition wall may be formed at a maximum opening position in an air conditioning mode in which only some of outlets of the defogging vent are used toward a side at which the defogging door is opened.

The air conditioner may include a first defogging door configured to adjust an opening of the first defogging flow path and the second defogging door configured to adjust an opening of the second defogging flow path.

The hot air guide baffle may be formed to extend longer than a length of the second defogging flow path in a front and rear direction of a vehicle to cover an inside of the air conditioning case on an opening of the second defogging flow path.

In a vent mode in which air is discharged to the face vent or a bi-level mode in which air is discharged to both the face vent and the floor vent, both the first defogging flow path and the second defogging flow path may be closed.

In a defogging mode in which air is discharged to the defrost vent, both the first defogging flow path and the second defogging flow path may be opened.

In a floor mode or a mix mode in which air is discharged to both the defrost vent and the floor vent, the first defogging flow path may be closed, and the second defogging flow path may be opened.

The air conditioner for a vehicle according to an exemplary embodiment of the present disclosure can improve the vertical temperature difference by dividing the defrost outlet so that hot air may be smoothly mixed with cooling air and forming the partition wall and the hot air guide baffle. As a result, when the vertical temperature difference is improved, it is possible to prevent the situation in which the occupant's head gets hot, increasing indoor comfort.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
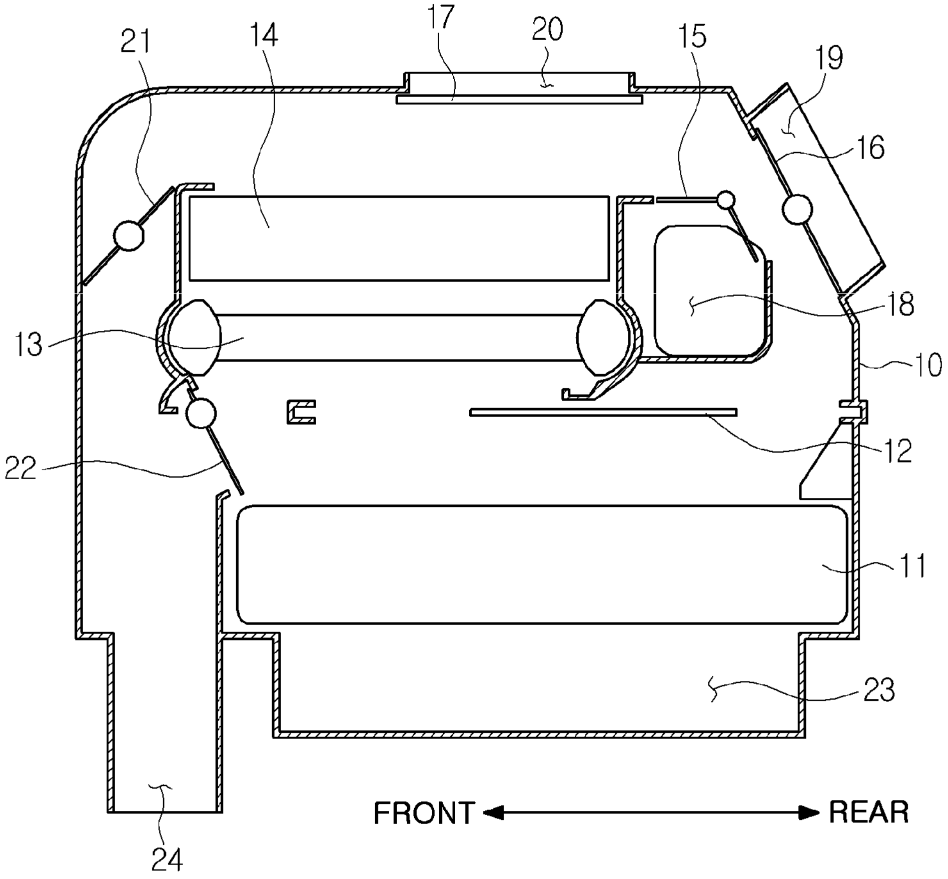
FIG. 1 is a side cross-sectional view illustrating a conventional air conditioner for a vehicle with horizontally-disposed heat exchangers.
Figure 2:
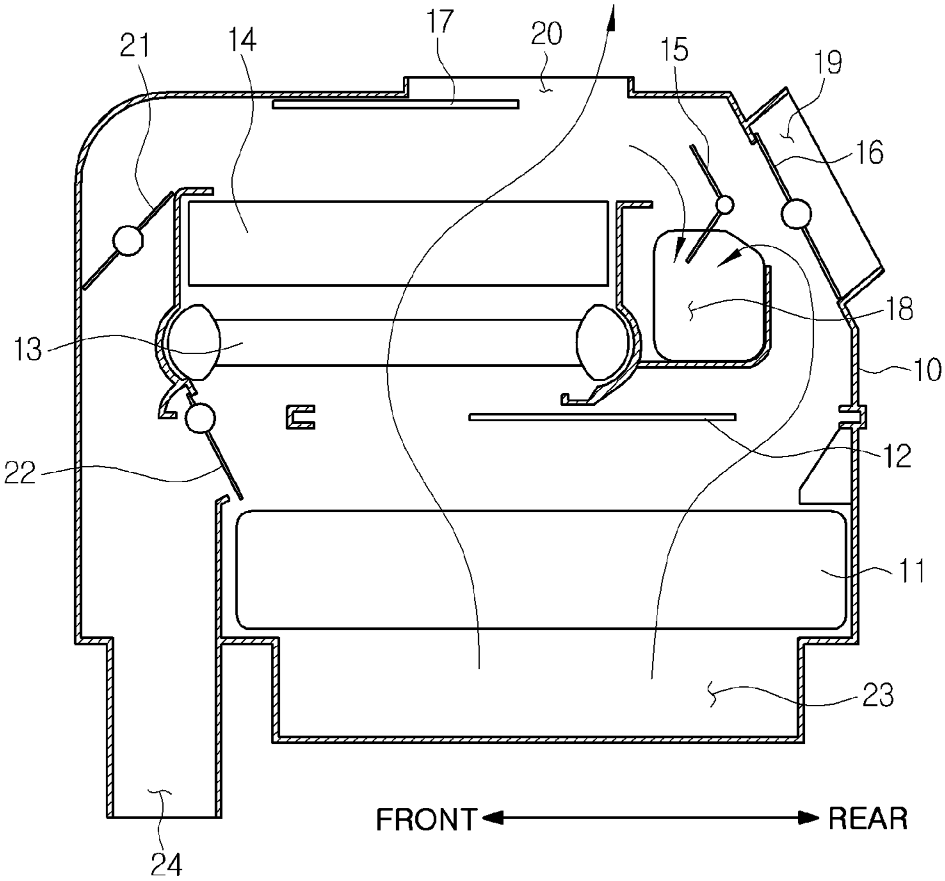
FIG. 2 is a view illustrating an operation example of FIG. 1.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a technical configuration of an air conditioner for a vehicle will be described in detail with reference to the accompanying drawings as follows.

Figure 3:
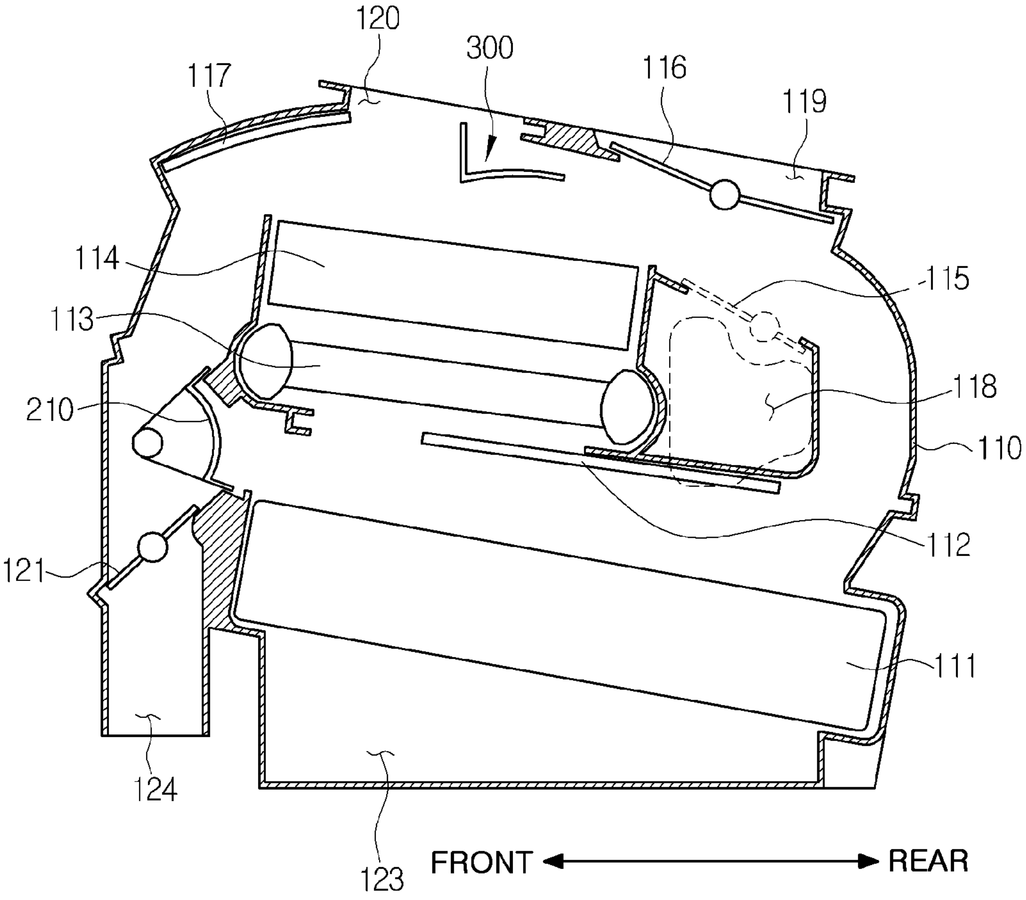
FIG. 3 is a side cross-sectional view exemplarily illustrating an air conditioner for a vehicle according to various exemplary embodiments of the present disclosure.
Figure 4:
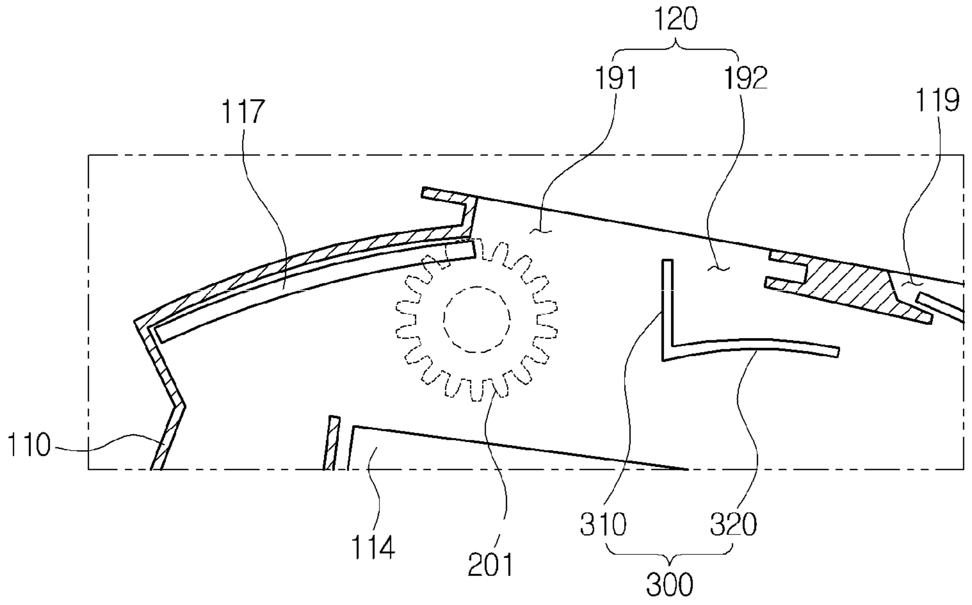
FIG. 4 and FIG. 5 are cross-sectional views exemplarily illustrating an enlarged portion of the air conditioner for a vehicle according to various exemplary embodiments of the present disclosure.

Referring to FIG. 3 and FIG. 4, the air conditioner for a vehicle according to various exemplary embodiments of the present disclosure is a slim type air conditioner formed of a horizontally-disposed heat exchanger type and includes a relatively smaller width in a vertical direction. The air conditioner for a vehicle includes an air conditioning case 110, a cooling heat exchanger and a heating heat exchanger, and a defogging outlet separator. In the following description, a left and right direction of FIG. 3 is a front and rear direction of the vehicle.

The air conditioning case 110 includes an air flow path formed therein and is formed of a slim type with a narrow width in the vertical direction. An air inlet 123 and a plurality of air outlets are formed on the air conditioning case 110. A blower unit for blowing air into the air conditioning case 110 is connected to the air inlet 123 of the air conditioning case 110. The blower unit selectively introduces inside air or outside air and blows the inside air or the outside air into the air conditioning case 110.

Furthermore, the air inlet 123 of the air conditioning case 110 is formed at the bottom portion of the cooling heat exchanger to allow air to flow from a lower portion to an upper portion thereof. The air outlet of the air conditioning case 110 includes a front seat air outlet for discharging air to front seats of the vehicle and a rear seat air outlet for discharging air to rear seats of the vehicle. The front seat air outlet includes a defrost vent 120, a face vent 119, and a floor vent 118, and the rear seat air outlet includes a rear seat vent 124.

The defrost vent 120 is for blowing air toward a window of the vehicle, the face vent 119 is for blowing air toward an occupant's face in the front seat of the vehicle, and the floor vent 118 is for blowing air toward the occupant's feet in the front seat of the vehicle. Furthermore, the rear seat vent 124 includes a console, a B-pillar, a rear seat floor vent, and the like for a vehicle.

Furthermore, a plurality of doors for adjusting an opening amount of the air outlet are provided in the air conditioning case 110. In other words, a defogging door 117 for adjusting an opening amount of the defrost vent 120, a vent door 116 for adjusting an opening amount of the face vent 119, a floor door 115 for adjusting an opening amount of the floor vent 118, and a rear seat air volume door 121 for adjusting an opening amount of the rear seat vent 124 are provided in the air conditioning case 110.

The cooling heat exchanger is formed as an evaporator 111, and the heating heat exchanger is formed as an indoor condenser 113. An electric heater 114, such as a positive temperature coefficient (PTC) heater, is provided at a downstream side of the indoor condenser 113 in the airflow direction. The evaporator 111 and the indoor condenser 113 are provided on a refrigerant circulation line connecting a compressor, an expansion valve, and the like and function as a cooler or a heat generator depending on a change in state of refrigerant. In other words, refrigerant passing through the evaporator 111 exchanges heat with the air to cool the air, and refrigerant passing through the indoor condenser 113 exchanges heat with the air to heat the air.

The evaporator 111 and the indoor condenser 113 are sequentially provided on an air flow path of the air conditioning case 110 in the airflow direction. In the instant case, the evaporator 111, the indoor condenser 113, and the electric heater 114, which are heat exchangers, are all disposed to lie horizontally. In other words, an internal flow path of the air conditioning case 110 is formed in the vertical direction with respect to the ground so that the air flow path is directed from a downward direction, which is a direction of gravity, to an upward direction. Furthermore, the cooling heat exchanger and the heating heat exchanger on the internal flow path include a structure which is sequentially disposed from the downward direction, which is the direction of gravity, to the upward direction in correspondence to the air flow path from the downward direction, which is the direction of gravity, to the upward direction.

As described above, the heat exchangers are disposed horizontally or to be inclined at a predetermined angle close to horizontality with respect to the ground. In other words, air flows into the air inlet 123 at the bottom portion of the air conditioning case 110 to flow from the bottom to the top, and the evaporator 111, the indoor condenser 113, and the electric heater 114 are disposed sequentially from the bottom portion.

A temperature door 112 is provided between the evaporator 111 and the indoor condenser 113. The temperature door 112 adjusts a temperature of the vehicle interior by adjusting an opening amount of a hot air passage in which air passes through the indoor condenser 113 and a cooling air passage through which air bypasses the indoor condenser 113. In other words, an amount of air passing through the indoor condenser 113 and the electric heater 114 and an amount of air bypassing the indoor condenser 113 and the electric heater 114 are adjusted depending on a position of the temperature door 112. Furthermore, the air conditioning case 110 includes a rear seat temperature door 210 disposed between the evaporator 111 and the indoor condenser 113 to adjust a temperature of air flowing to the rear seat air outlet.

The temperature door 112 is formed of a plate-shaped door and slides in the horizontal direction in the air conditioning case 110 to adjust an opening amount between the cooling air passage and the hot air passage. The sliding type temperature door 112 greatly helps in slimming a vertical width of the air conditioning case 110. Furthermore, a separator for partitioning left and right sides in a width direction of the vehicle is provided inside the air conditioning case 110 to perform left and right independent air conditioning of a driver's seat and a passenger's seat in the front of the vehicle.

Meanwhile, the rear seat air outlet is disposed in front of the front seat air outlet. In other words, the rear seat vent 124, which is the rear seat air outlet, is disposed at a front side of the air conditioning case 110, and the defrost vent 120, the face vent 119, and the floor vent 118, which are the front seat air outlets, are all disposed behind the rear seat vent 124. The defrost vent 120 and the face vent 119 are formed on an upper end portion of the air conditioning case 110, and the floor vents 118 are formed on both side surfaces of the air conditioning case 110. Furthermore, the defrost vent 120 is disposed in front of the face vent 119.

The defrost vent 120 includes a first defogging flow path 191 and a second defogging flow path 192. The first defogging flow path 191 allows air passing through the upstream heat exchanger (heating heat exchanger) in the airflow direction to be directly discharged to the interior. Furthermore, the second defogging flow path 192 allows air passing through a plurality of heat exchangers (the cooling heat exchanger and the heating heat exchanger) to be mixed and then discharged to the interior.

In other words, the first defogging flow path 191 is a flow path through which hot air passing through both the evaporator 111 and the indoor condenser 113 is discharged. Furthermore, the second defogging flow path 192 is a flow path through which hot air passing through both the evaporator 111 and the indoor condenser 113 and cooling air passing through the evaporator 111 and bypassing the indoor condenser 113 are mixed and discharged therethrough. The upstream heat exchanger in the airflow direction is the indoor condenser 113 and the electric heater 114, and the plurality of heat exchangers are the evaporator 111, the indoor condenser 113, and the electric heater 114. Furthermore, the defrost vent 120 is formed in a position of the air conditioning case 110 facing the heating heat exchanger or formed to overlap the air conditioning case 110. In other words, the electric heater 114 is disposed to face an outlet of the defrost vent 120.

An air conditioner for a vehicle according to various exemplary embodiments of the present disclosure includes a defogging outlet separator 300. The defogging outlet separator 300 is configured to prevent the hot air passing through the heating heat exchanger from being discharged directly through the second defogging flow path 192. The defogging outlet separator 300 includes a partition wall 310 and a hot air guide baffle 320. Meanwhile, the first defogging flow path 191, the second defogging flow path 192, and the face vent 119 are sequentially disposed from the front toward the rear of the vehicle.

The partition wall 310 is formed to extend in the vertical direction in the air conditioning case 110 to partition between the first defogging flow path 191 and the second defogging flow path 192. An upper end portion of the partition wall 310 is positioned on the upper portion of the air conditioning case 110 on which the defrost vent 120 is formed. The partition wall 310 may be formed to extend throughout the entire inside of the air conditioning case 110 in the width direction of the vehicle.

The hot air guide baffle 320 extends from the partition wall 310 and is formed to block air passing through the heating heat exchanger from being discharged directly through the second defogging flow path 192. In other words, the hot air guide baffle 320 is formed to extend substantially in the horizontal direction from a lower end portion of the partition wall 310 toward the face vent 119. The defogging outlet separator 300 including the partition wall 310 and the hot air guide baffle 320 has substantially an "L" shape in a side cross-sectional view.

Meanwhile, the defogging door 117 is slidably connected to the inlet of the defrost vent 120 in the air conditioning case 110 and adjusts opening amounts of the first defogging flow path 191 and the second defogging flow path 192. In the instant case, the defogging door 117 is opened in an order of the second defogging flow path 192 and the first defogging flow path 191. In other words, the defogging door 117 is engaged with a driving gear 201, and when the driving gear 201 is rotated by a power source, the defogging door 117 slides to open or close the defrost vent 120.

Figure 5:
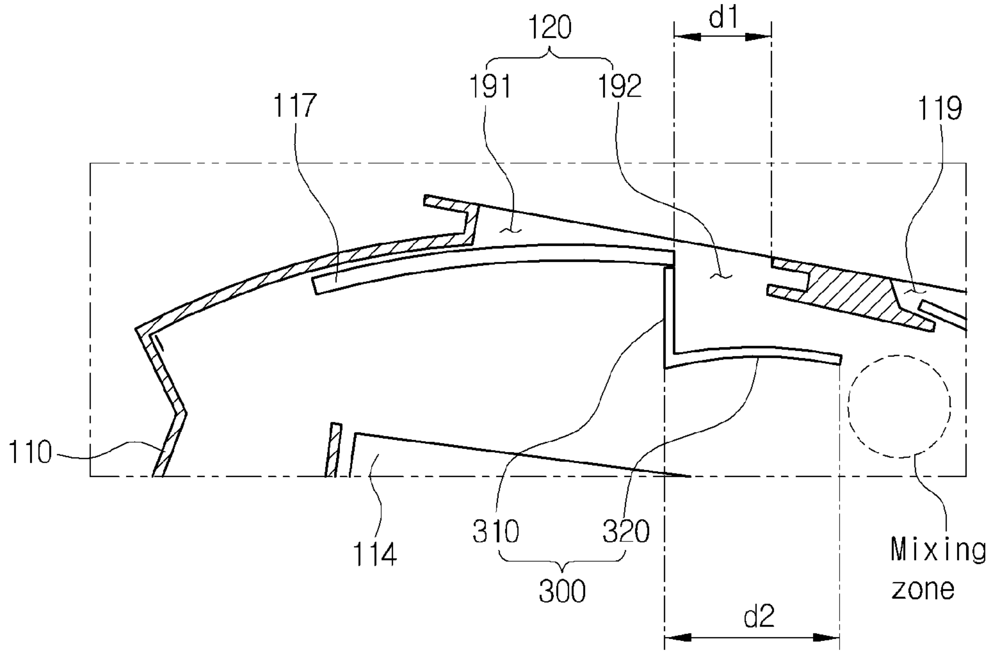

Further referring to FIG. 5, the hot air guide baffle 320 is formed to extend longer than a length of the second defogging flow path 192 in a front and rear direction of the vehicle to cover the inside of the air conditioning case 110 at the opening of the second defogging flow path 192. In other words, an extending length d2 of the hot air guide baffle 320 is formed greater than a front-to-rear length d1 of the second defogging flow path 192 so that the inside of the air conditioning case 110 is invisible when the air conditioning case 110 is viewed from the opening of the second defogging flow path 192.

In a state in which the defogging door 117 closes the first defogging flow path 191 and opens only the second defogging flow path 192, the hot air passing through the heating heat exchanger may not be discharged by being blocked by the defogging door 117 and is guided to the rear side at which the face vent 119 is positioned. The hot air guided to the rear side passes through the cooling heat exchanger, is mixed after meeting the cooling air bypassing the heating heat exchanger, and then discharged to the vehicle interior through the second defogging flow path 192. A mixing zone between the cooling air and the hot air is formed in a portion marked by the dotted line in FIG. 5.

Figure 6:
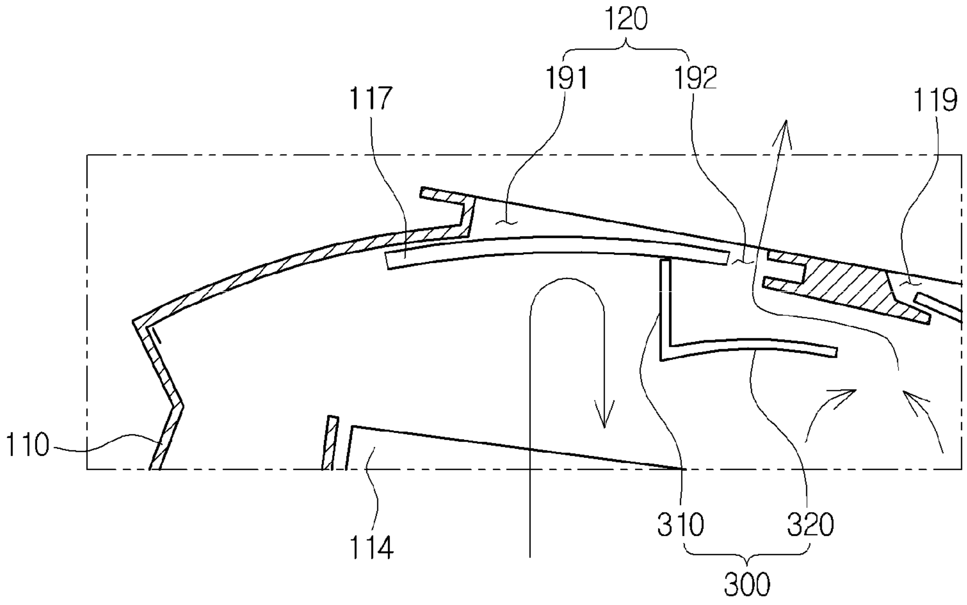
FIG. 6 and FIG. 7 are views exemplarily illustrating an air flow in a state in which a defrost vent according to various exemplary embodiments of the present disclosure is partially opened.

Further referring to FIG. 6, in a floor mode in which air is discharged to the floor vent 118 and some air are discharged to the defrost vent 120, the defogging door 117 opens only a portion of the second defogging flow path 192. Even in the floor mode, the same airflow occurs as illustrated in FIG. 5. In other words, the hot air passing through the heating heat exchanger may not be discharged to the first defogging flow path 191 by being blocked by the defogging door 117 and is guided to the rear side at which the face vent 119 is positioned by the hot air guide baffle 320. The hot air guided to the rear side passes through the cooling heat exchanger, is mixed after meeting the cooling air bypassing the heating heat exchanger, and then discharged to the vehicle interior through the second defogging flow path 192.

Figure 7:
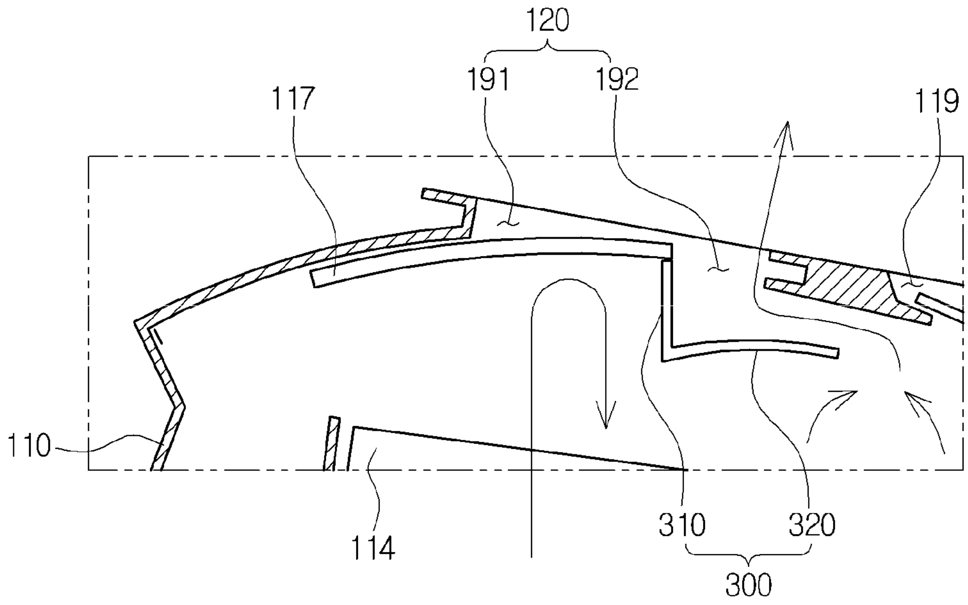

Further referring to FIG. 7, in a mix mode in which air is discharged to the floor vent 118 and some air are discharged to the defrost vent 120, the defogging door 117 maximally opens the second defogging flow path 192. In other words, the partition wall 310 is formed at a maximum opening position in the air conditioning mode in which only some of the outlets of the defrost vent 120 are used toward a side at which the defogging door 117 is opened. As described above, in the mix mode, the position of the partition wall is selected based on the opening of the defogging door 117.

Even in the mix mode, the same airflow occurs as illustrated in FIG. 6. In other words, the hot air passing through the heating heat exchanger may not be discharged to the first defogging flow path 191 by being blocked by the defogging door 117 and is guided to the rear side at which the face vent 119 is positioned by the hot air guide baffle 320. The hot air guided to the rear side passes through the cooling heat exchanger, is mixed after meeting the cooling air bypassing the heating heat exchanger, and then discharged to the vehicle interior through the second defogging flow path 192.

Figure 8:
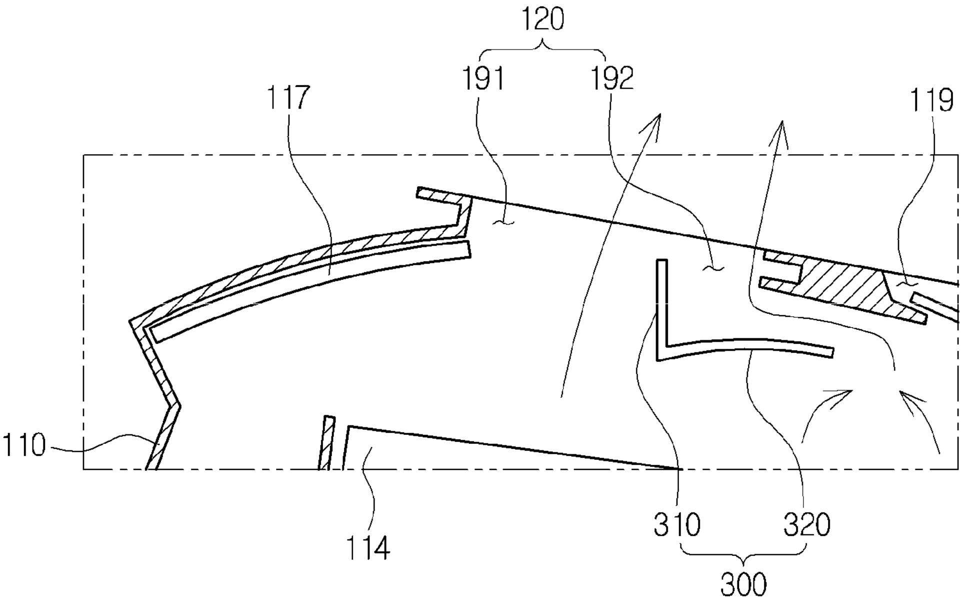
FIG. 8 is a view exemplarily illustrating an air flow in a state in which the defrost vent according to various exemplary embodiments of the present disclosure is fully opened.

Further referring to FIG. 8, in a defogging mode in which air is discharged to the defrost vent 120, the defogging door 117 opens both the first defogging flow path 191 and the second defogging flow path 192. Some of the hot air passing through the heating heat exchanger are discharged to the first defogging flow path 191. Meanwhile, the others of the hot air passing through the heating heat exchanger are guided to the rear side at which the face vent 119 is positioned by the hot air guide baffle 320. The hot air guided to the rear side passes through the cooling heat exchanger, is mixed after meeting the cooling air bypassing the heating heat exchanger, and then discharged to the vehicle interior through the second defogging flow path 192.

Figure 9:
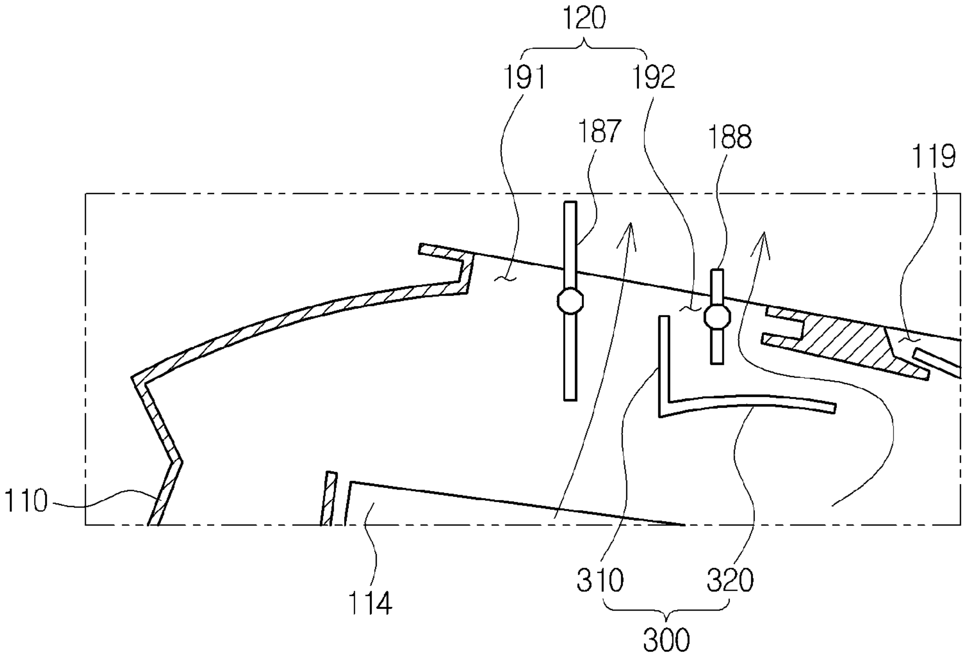
FIG. 9 and FIG. 10 are side cross-sectional views exemplarily illustrating a portion of an air conditioner for a vehicle according to a modified example of FIG. 3.
Figure 10:
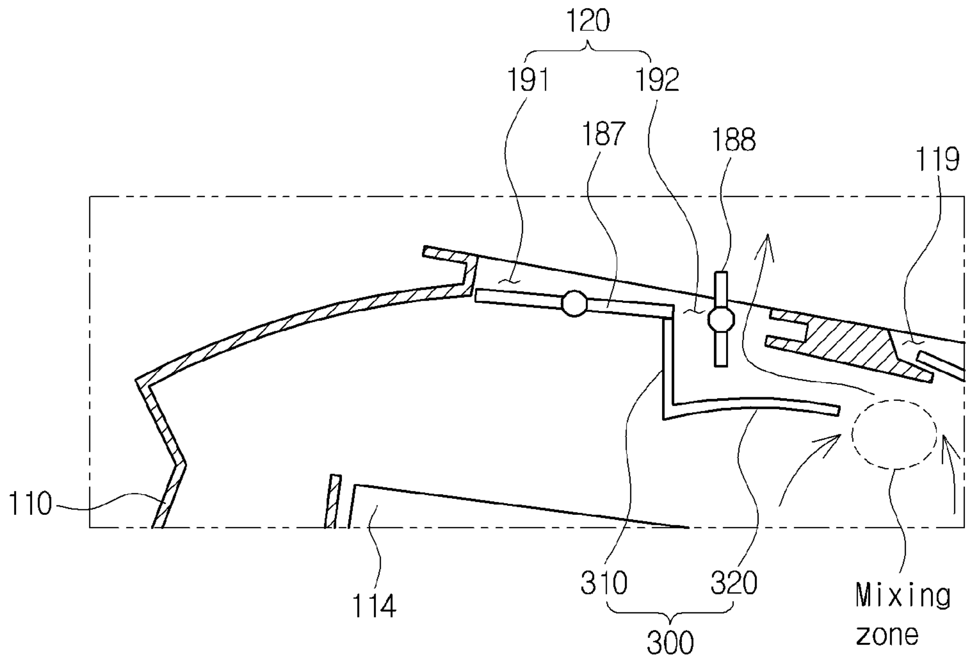

Meanwhile, FIG. 9 and FIG. 10 are side cross-sectional views exemplarily illustrating a portion of an air conditioner for a vehicle according to a modified example of FIG. 3. Further referring to FIG. 9 and FIG. 10, the defogging door includes a first defogging door 187 and a second defogging door 188. The first defogging door 187 adjusts an opening amount of the first defogging flow path 191, and the second defogging door 188 adjusts an opening amount of the second defogging flow path 192. The first defogging door 187 and the second defogging door 188 are each independently controlled to be rotated to individually control the first defogging flow path 191 and the second defogging flow path 192 for each air conditioning mode.

Figure 11:
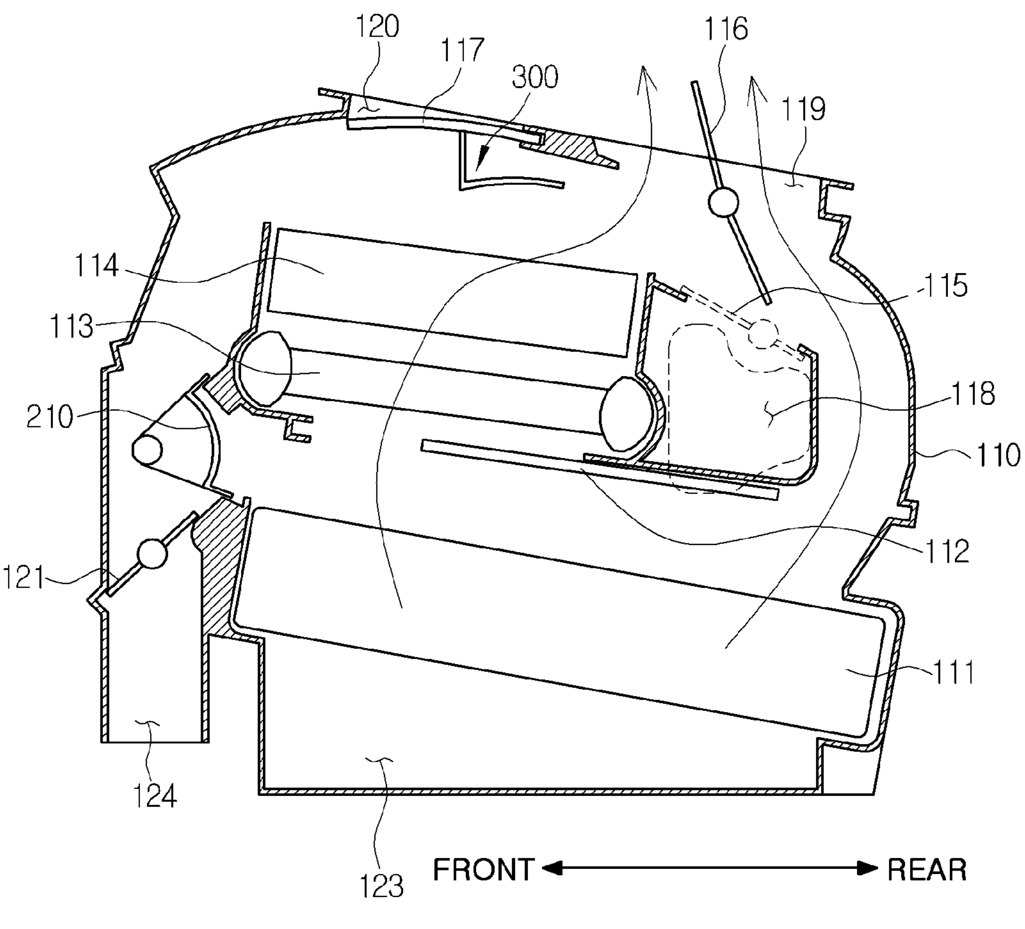
FIG. 11 is a view exemplarily illustrating a vent mode of the air conditioner for a vehicle according to various exemplary embodiments of the present disclosure.

Further referring to FIG. 11, in a vent mode, the defrost vent 120 is closed, the face vent 119 is opened, and the floor vent 115 is closed. The hot air passing through the indoor condenser 113 and the electric heater 114 and the cooling air passing through the evaporator 111 are mixed and then discharged to the face vent 119. In the instant case, both the first defogging flow path 191 and the second defogging flow path 192 are closed.

Figure 12:
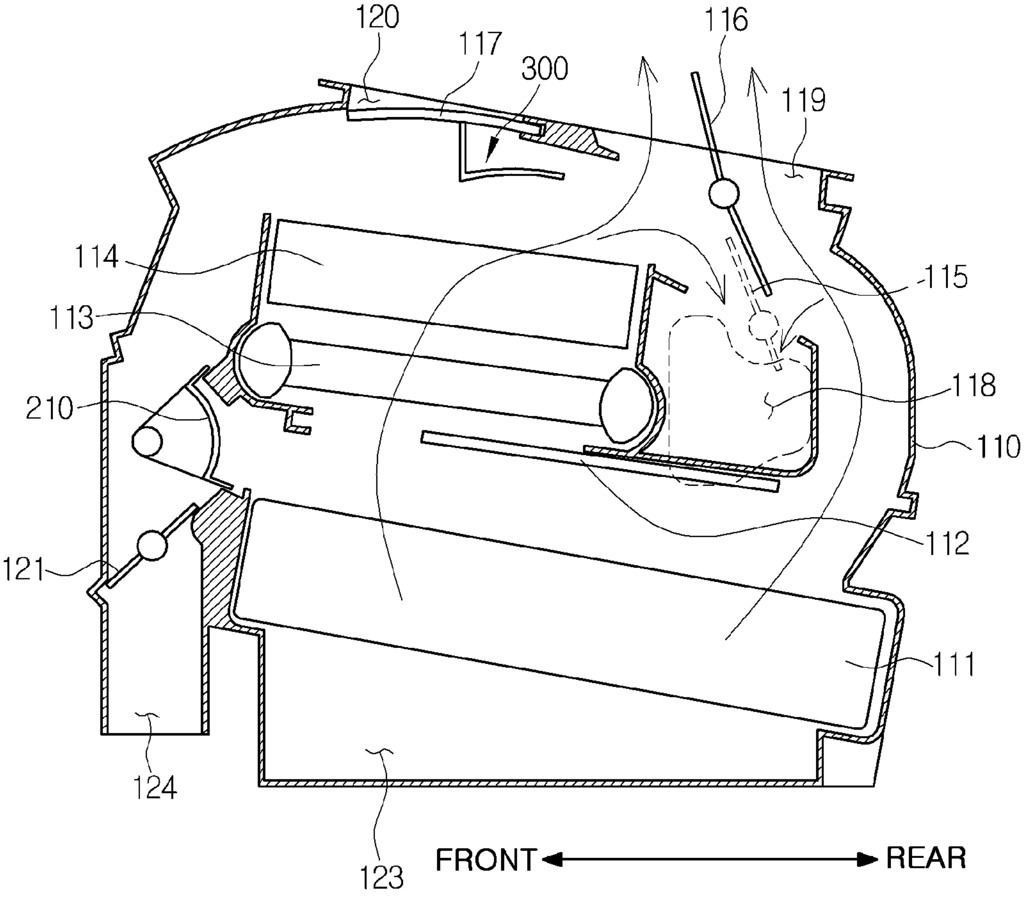
FIG. 12 is a view exemplarily illustrating a bi-level mode of the air conditioner for a vehicle according to various exemplary embodiments of the present disclosure.

Further referring to FIG. 12, in a bi-level mode, the defrost vent 120 is closed, the face vent 119 is opened, and the floor vent 115 is opened. The hot air passing through the indoor condenser 113 and the electric heater 114 and the cooling air passing through the evaporator 111 are mixed, and then some are discharged to the face vent 119 and the others are discharged to the floor vent 115. In the instant case, both the first defogging flow path 191 and the second defogging flow path 192 are closed.

Figure 13:
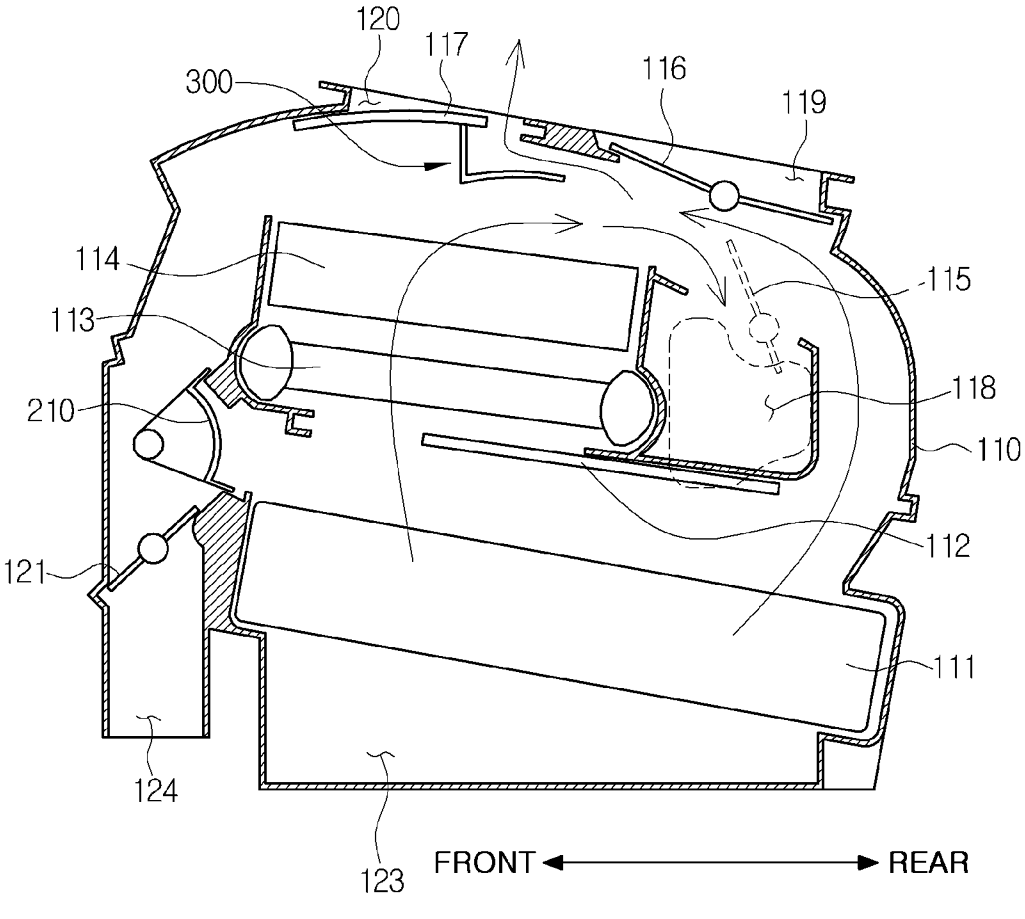
FIG. 13 is a view exemplarily illustrating a floor mode or a mix mode of the air conditioner for a vehicle according to various exemplary embodiments of the present disclosure.

Further referring to FIG. 13, in the floor mode or the mix mode, the defrost vent 120 is opened, the face vent 119 is closed, and the floor vent 115 is opened. In the instant case, the first defogging flow path 191 is closed, and the second defogging flow path 192 is opened. The hot air passing through the indoor condenser 113 and the electric heater 114 is guided to the rear side by the hot air guide baffle 320 and mixed with the cooling air passing through the evaporator 111, and then some are discharged to the second defogging flow path 192. Furthermore, the others are discharged to the floor vent 115.

Figure 14:
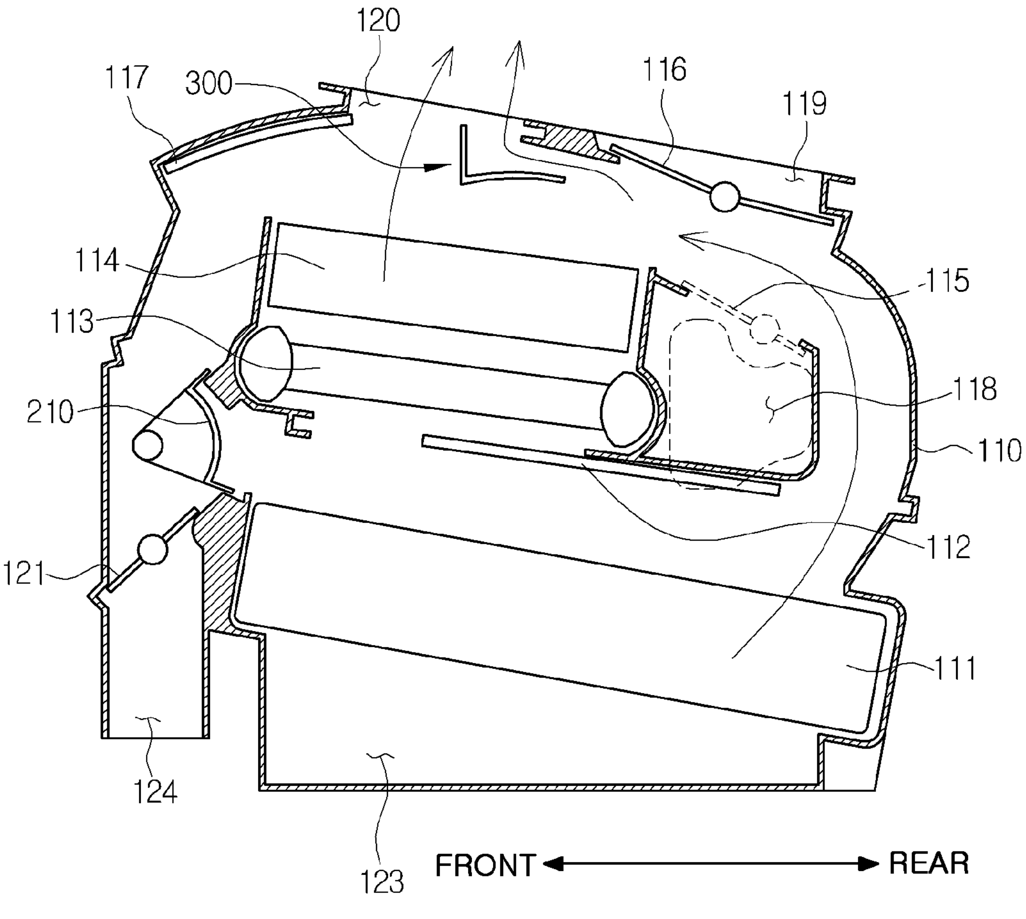
FIG. 14 is a view exemplarily illustrating a defogging mode of the air conditioner for a vehicle according to various exemplary embodiments of the present disclosure.

Further referring to FIG. 14, in a defogging mode, the defrost vent 120 is opened, the face vent 119 is closed, and the floor vent 115 is closed. In the instant case, both the first defogging flow path 191 and the second defogging flow path 192 are opened. Some of the hot air passing through the indoor condenser 113 and the electric heater 114 are discharged to the first defogging flow path 191. The others are guided to the rear side by the hot air guide baffle 320 and mixed with the cooling air passing through the evaporator 111, and then some are discharged to the second defogging flow path 192.

In summary, in the air conditioning mode in which only some of the outlets of the defrost vent are used, such as the floor mode or the mix mode, there is a problem in that hot air is easily discharged to the defrost vent due to the structure of the air conditioner with the horizontally-disposed heat exchangers. To solve the problem, by dividing the defrost outlet so that hot air may be smoothly mixed with cooling air and forming the partition wall and the hot air guide baffle, it is possible to improve the vertical temperature difference. As a result, when the vertical temperature difference is improved, it is possible to prevent the situation in which the occupant's head gets hot, increasing indoor comfort.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An air conditioner apparatus for a vehicle, the apparatus comprising:
- an air conditioning case in which an air flow path is formed;
- a cooling heat exchanger; and
- a heating heat exchanger,
- wherein the cooling heat exchanger and the heating heat exchanger are provided sequentially on the air flow path of the air conditioning case in an airflow direction,
- wherein a defrost vent, a face vent, and a floor vent are formed on the air conditioning case, and
- wherein the defrost vent includes:
  - a first defogging flow path allowing air passing through the heating heat exchanger to be discharged directly; and
  - a second defogging flow path allowing air passing through the cooling heat exchanger or the heating heat exchanger to be mixed and discharged therethrough;
  - a defogging outlet separator configured to prevent heated air passing through the heating heat exchanger to be directly discharged through the second defogging flow path,
  - wherein the defogging outlet separator includes a partition wall configured to partition between the first defogging flow path and the second defogging flow path in the defrost vent, and a hot air guide baffle formed to extend from the partition wall to block the heated air passing through the heating heat exchanger from being discharged directly through the second defogging flow path.

2. The air conditioner apparatus of claim 1,
wherein an internal flow path of the air conditioning case is formed in a vertical direction with respect to the ground so that the air flow path is directed from a downward direction, which is a direction of gravity, to an upward direction.

3. The air conditioner apparatus of claim 2, wherein the cooling heat exchanger and the heating heat exchanger on the internal flow path include a structure which is sequentially disposed from the downward direction, which is the direction of gravity, to the upward direction in correspondence to the air flow path from the downward direction, which is the direction of gravity, to the upward direction.

4. The air conditioner apparatus of claim 3, wherein in a vent mode in which the air is discharged to the face vent or a bi-level mode in which the air is discharged to the face vent and the floor vent, the first defogging flow path and the second defogging flow path are closed.

5. The air conditioner apparatus of claim 3, wherein in a defogging mode in which the air is discharged to the defrost vent, the first defogging flow path and the second defogging flow path are opened.

6. The air conditioner apparatus of claim 3, wherein in a floor mode or a mix mode in which the air is discharged to the defrost vent and the floor vent, the first defogging flow path is closed, and the second defogging flow path is opened.

7. The air conditioner apparatus of claim 1, wherein the first defogging flow path, the second defogging flow path, and the face vent are sequentially disposed from a front toward a rear of the vehicle, and wherein the partition wall extends in the vertical direction, and the hot air guide baffle is formed to extend from a lower end portion of the partition wall toward the face vent.

8. The air conditioner apparatus of claim 1, further including:

a defogging door slidably connected to an inlet of the defrost vent to adjust openings of the first defogging flow path and the second defogging flow path, wherein the defogging door is opened in an order of the second defogging flow path and the first defogging flow path.

9. The air conditioner apparatus of claim 8, wherein the partition wall is formed at a maximum opening position in an air conditioning mode in which a predetermined number of outlets of the defogging vent are used toward a side at which the defogging door is opened.

10. The air conditioner apparatus of claim 1, further including a first defogging door configured to adjust an opening of the first defogging flow path.

11. The air conditioner apparatus of claim 1, further including a second defogging door configured to adjust an opening of the second defogging flow path.

12. The air conditioner apparatus of claim 1, wherein the hot air guide baffle is formed to extend longer than a length of the second defogging flow path in a front and rear direction of the vehicle to cover an inside of the air conditioning case on an opening of the second defogging flow path.

13. The air conditioner apparatus of claim 1, wherein the defrost vent is formed in a position of the air conditioning case facing the heating heat exchanger or to overlap the air conditioning case.

* * * * *